(12) United States Patent
Hosotani (10) Patent No.: US 10,992,183 B2
(45) Date of Patent: Apr. 27, 2021

(54) HIGH-FREQUENCY POWER SUPPLY DEVICE

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 16/777,791

(22) Filed: Jan. 30, 2020

(65) Prior Publication Data
US 2020/0169120 A1    May 28, 2020

Related U.S. Application Data

(63) Continuation of application No. PCT/JP2018/021477, filed on Jun. 5, 2018.

(30) Foreign Application Priority Data

Oct. 12, 2017    (JP) .............................. JP2017-198456

(51) Int. Cl.
     *H02J 50/12*      (2016.01)
     *H02M 1/08*      (2006.01)
     *H02M 7/537*      (2006.01)

(52) U.S. Cl.
CPC ............... *H02J 50/12* (2016.02); *H02M 1/08* (2013.01); *H02M 7/537* (2013.01)

(58) Field of Classification Search
CPC ............ H02J 50/10; H02J 50/12; H02M 1/08; H02M 7/537

(Continued)

(56) References Cited

U.S. PATENT DOCUMENTS

2015/0180240 A1*   6/2015   Kwon ..................... H02J 50/12
                                                                            307/104

FOREIGN PATENT DOCUMENTS

JP        S59-106882 A    6/1984
JP        2000-308250 A    11/2000
(Continued)

OTHER PUBLICATIONS

International Search Report issued in PCT/JP2018/021477; dated Aug. 21, 2018.
(Continued)

*Primary Examiner* — William Hernandez
(74) *Attorney, Agent, or Firm* — Studebaker & Brackett PC (57) ABSTRACT

A high-frequency power supply device includes a power transmission coil, a high-frequency power circuit which converts direct-current power input from a direct-current power supply into high-frequency power and supply the high-frequency power to the power transmission coil, a detection circuit which detects a voltage based on a circuit operation of the high-frequency power circuit and output a detected voltage, a control circuit configured to control a circuit operation of the high-frequency power circuit and to determine a command value used to protect the high-frequency power supply device based on information externally input into a processor, a D/A converter which performs D/A conversion upon receiving the command value output from the control circuit and output a command voltage, and a comparator which compares the command voltage and the detected voltage with each other and output a stop signal used to stop a circuit operation of the high-frequency power supply device.

18 Claims, 3 Drawing Sheets

(58) Field of Classification Search
USPC .......................................................... 307/104
See application file for complete search history.

(56) References Cited

FOREIGN PATENT DOCUMENTS

| | | |
|---|---|---|
| JP | 2002-051454 A | 2/2002 |
| JP | 2005-051922 A | 2/2005 |
| JP | 2006-246615 A | 9/2006 |
| JP | 2007-306757 A | 11/2007 |
| JP | 2008-148407 A | 6/2008 |
| JP | 2013-066272 A | 4/2013 |
| JP | 2014-042389 A | 3/2014 |

OTHER PUBLICATIONS

Written Opinion issued in PCT/JP2018/021477; dated Aug. 21, 2018.

* cited by examiner

HIGH-FREQUENCY POWER SUPPLY DEVICE

CROSS-REFERENCE TO RELATED APPLICATIONS

This application claims benefit of priority to International Patent Application No. PCT/JP2018/021477, filed Jun. 5, 2018, and to Japanese Patent Application No. 2017-198456, filed Oct. 12, 2017, the entire contents of each are incorporated herein by reference.

BACKGROUND

Technical Field

The present disclosure relates to a high-frequency power supply device that provides magnetic field coupling between a power transmission coil and a power receiving coil and supplies power from the power transmission coil to the power receiving coil.

Background Art

A power supply circuit included in a high-frequency power supply device includes, to perform various stable controls and various protection operations under abnormal conditions, a detection circuit for detecting the voltage, current, and temperature of each portion and a control circuit for performing predetermined normal operation control and predetermined protection operation control in accordance with detected values.

For example, Japanese Unexamined Patent Application Publication No. 2002-51454 discloses a power supply device including a limiter control circuit for outputting a limit control signal used to stop the charging of a secondary battery when a charging voltage for the secondary battery reaches a predetermined limit voltage. The limiter control circuit includes a reference voltage generation unit for generating a reference voltage from a power supply voltage on the basis of voltage setting data corresponding to an input limit voltage, a voltage detection unit for detecting the voltage of the secondary battery and outputting the detected voltage, and a voltage comparison unit for comparing the reference voltage and the detected voltage with each other and outputting the limit control signal.

SUMMARY

A limit value used to practically protect a power supply circuit included in the power supply device changes in response to the change in the specification of the power supply device and the change in an operating environment used. For example, when the power supply device is used in a high temperature environment, output power derating needs to be performed to protect the power supply circuit. The output power derating is performed such that the power supply circuit is used with output power smaller than a rated value used in an ordinary temperature environment. Thus, when the power supply device is used in a high temperature environment, the limit value of output power used to protect the power supply circuit and a threshold value used to determine the limit value are set to be smaller than those in an ordinary temperature environment. The setting of voltage setting data corresponding to respective limit voltages disclosed in Japanese Unexamined Patent Application Publication No. 2002-51454 is insufficient to appropriately support the change in a safe limit value for a power supply device which occurs in response to the change in the specification of the power supply device and the change in an operating environment. As a result, the reliability of the power supply device is reduced.

In a high-reliability power supply device, an operation for a protection function and characteristics need to be changed on the basis of use conditions including the use environment and secular change of the power supply device.

Accordingly, the present disclosure provides a high-reliability high-frequency power supply device capable of performing appropriate normal operation control and appropriate protection operation control in response to changes in use conditions including an application, a use environment, and a secular change in part characteristics.

(1) A high-frequency power supply device according to the present disclosure includes a power transmission coil that is magnetically coupled to a power receiving coil in a power receiving circuit and a high-frequency power circuit configured to convert direct-current power input from a direct-current power supply into high-frequency power and supply the high-frequency power to the power transmission coil. The high-frequency power supply device further includes a detection circuit configured to detect a voltage based on a circuit operation of the high-frequency power circuit and output a detected voltage, a control circuit configured to control a circuit operation of the high-frequency power circuit, a D/A converter configured to perform D/A conversion upon a command value output from the control circuit and output a command voltage, and a comparator that is formed of an analog electronic circuit and is configured to compare the command voltage and the detected voltage with each other and output a stop signal used to stop a circuit operation of the high-frequency power circuit to the high-frequency power circuit. The control circuit is configured to determine a value with which the high-frequency power circuit can be protected as the command value.

Only by causing the control circuit to set a value with which the high-frequency power circuit can be protected as the command value on the basis of the operating condition of the high-frequency power circuit with the above configuration, the high-frequency power circuit can be protected. For example, a value with which the high-frequency power circuit can be protected can be determined as the command value on the basis of the operating environment of the high-frequency power circuit.

(2) The control circuit may include a processor into which information is input from an external device and determine the command value on the basis of the information.

By determining the command value on the basis of also externally given information with the above configuration, the reliability of an entire system including the high-frequency power supply device can be increased.

(3) The high-frequency power circuit preferably includes a switching element connected to the direct-current power supply and a driver circuit configured to drive the switching element. The control circuit preferably supplies a switching control signal to the driver circuit. The control circuit preferably supplies the stop signal to one of a control terminal of the switching element, the driver circuit, and the control circuit. A delay time from a time at which the stop signal starts to be input into a control terminal of the switching element to a time at which a power conversion circuit operation of the high-frequency power circuit stops, a delay time from a time at which the stop signal starts to be input into the driver circuit to a time at which a power conversion circuit operation of the high-frequency power circuit stops, and a delay time from a time at which the stop signal starts to be input into the control circuit to a time at which a power conversion circuit operation of the high-frequency power circuit stops are preferably set to decrease in this order.

That is, the relationship of Tg<Td<Tc is established where Tg represents a delay time from the input of a stop signal to the control terminal of the switching element to a time at which the power conversion circuit operation actually stops, Td represents a delay time from the input of a stop signal to the driver circuit to a time at which the power conversion circuit operation actually stops, and Tc represents a delay time from the input of a stop signal to the control circuit to a time at which the power conversion circuit operation actually stops.

By selecting one of the control terminal of the switching element, the driver circuit, and the control circuit as a stop signal input destination in accordance with urgency of the stop of the power conversion circuit operation with the above configuration, the power conversion circuit operation can be stopped with optimum responsivity.

(4) The detection circuit is preferably one of a plurality of detection circuits each configured to detect a voltage based on a circuit operation of a corresponding portion of the high-frequency power circuit and output the detected voltage. The D/A converter is preferably one of a plurality of D/A converters each configured to perform D/A conversion upon the command value output from the control circuit and output the command voltage. The comparator is preferably one of a plurality of comparators each configured to compare the command voltage and the detected voltage with each other and output the stop signal. The stop signal is preferably supplied to two or more of the switching element, the driver circuit, and the control circuit.

With the above configuration, a plurality of types of protection controls are performed on the basis of, for example, the type of an abnormal condition.

(5) The detection circuit is preferably one of a plurality of detection circuits each configured to detect a voltage based on a circuit operation of a corresponding portion of the high-frequency power circuit and output the detected voltage. The D/A converter is preferably one of a plurality of D/A converters each configured to perform D/A conversion upon the command value output from the control circuit and output the command voltage. The comparator is preferably one of a plurality of comparators each configured to compare the command voltage and the detected voltage with each other and output the stop signal. The stop signals output from the plurality of respective comparators are preferably supplied such that an OR circuit is formed in one of the switching element, the driver circuit, and the control circuit.

With the above configuration, protection control is performed with responsivity suitable for, for example, the type of an abnormal condition even if the same target is to be stopped.

(6) The voltage based on a circuit operation of the high-frequency power circuit preferably includes two or more of a voltage input from the direct-current power supply, a voltage corresponding to a magnitude of a current input from the direct-current power supply, a voltage corresponding to a magnitude of a resonant voltage at the power transmission coil, a voltage corresponding to a temperature of the switching element, and a voltage corresponding to a magnitude of a current flowing through the switching element.

With the above configuration, among an abnormal voltage input form the direct-current power supply, an abnormal current input form the direct-current power supply, an abnormal resonant voltage at the power transmission coil, an abnormal temperature of the switching element, and an abnormal current flowing through the switching element, protection control suitable for a plurality of abnormal conditions is performed.

(7) A set of the detection circuit, the D/A converter, and the comparator is preferably provided in plurality in accordance with a response speed requested for a protection circuit operation of the high-frequency power circuit.

Since an appropriate D/A converter and an appropriate comparator are used in accordance with a response speed requested for an operation of protecting the high-frequency power circuit with the above configuration, cost reduction can be realized while necessary responsivity is ensured.

(8) The control circuit includes a command value correction unit configured to correct the command value in accordance with a temperature in an operating environment of the high-frequency power circuit.

With the above configuration, the command value used to protect the high-frequency power circuit can be optimized in accordance with a temperature in the operating environment of the high-frequency power circuit.

(9) The control circuit includes a correction unit configured to perform analysis on the basis of a set of data on a temperature in an operating environment of the high-frequency power circuit, an operating time of the high-frequency power circuit, and the detected voltage, extract an useful rule or a judgement criterion from the set of data, and correct the command value on the basis of the rule or the judgement criterion by machine learning.

By continuously using the high-frequency power circuit with the above configuration, an algorithm for determining an optimum command value is corrected in response to a changing operating environment temperature, an operating time, and the detected voltage. As a result, an optimum command value is automatically determined for the protection of the high-frequency power circuit.

According to the present disclosure, there can be provided a high-reliability high-frequency power supply device capable of changing an operation for a protection function and characteristics in response to changes in use conditions including an application, a use environment, and a secular change in part characteristics and performing appropriate normal operation control and appropriate protection operation control. Because of the adaption to an application and a use environment, a high-efficiency and high-performance high-frequency power supply device can be provided.

DETAILED DESCRIPTION

A plurality of embodiments for carrying out the present disclosure will be described below by giving some concrete examples with reference to the drawings. The same parts are denoted by the same reference symbols in the drawings. While the embodiments are described separately for the sake of convenience in consideration of ease of explanation and understanding of key points, configurations described in the different embodiments can be partly replaced or combined. In the second and subsequent embodiments, descriptions of matters common to those in the first embodiment will be omitted and only different points will be described. In particular, descriptions of similar advantageous effects obtained with similar configurations will not be repeated in each of the embodiments.

First Embodiment

Figure 1:
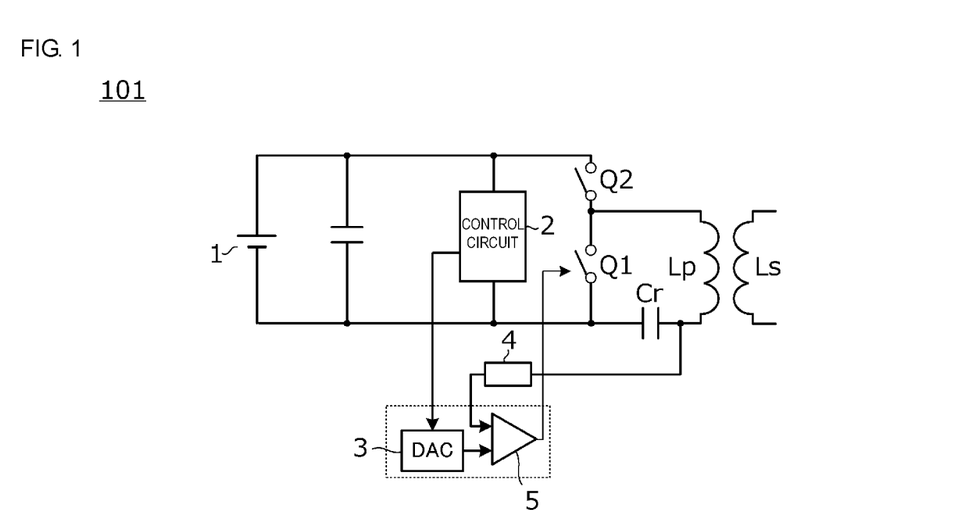
FIG. 1 is a circuit diagram of a high-frequency power supply device 101 according to a first embodiment.

FIG. 1 is a circuit diagram of a high-frequency power supply device 101 according to a first embodiment. The high-frequency power supply device 101 includes a power transmission coil Lp that is magnetically coupled to a power receiving coil Ls that is a power receiving device and a high-frequency power circuit for converting a direct-current power input from a direct-current power supply 1 into high-frequency power and supplying the high-frequency power to the power transmission coil Lp. In this example, the high-frequency power supply device 101 includes switching elements Q1 and Q2 connected to the direct-current power supply 1, a resonant capacitor Cr, and a driver circuit (not illustrated) for driving the switching elements Q1 and Q2.

The high-frequency power supply device 101 includes a detection circuit 4 for detecting the resonant voltage of a resonant circuit formed of the power transmission coil Lp and the resonant capacitor Cr and generating the detected voltage, a control circuit 2 for controlling the above high-frequency power circuit, and a D/A converter 3 for performing D/A conversion upon a command value output from the control circuit 2 and outputting a command voltage.

The high-frequency power supply device 101 further includes a comparator 5 for comparing a command voltage output from the D/A converter 3 and a detected voltage with each other and outputting a stop signal to the switching element Q1.

The control circuit 2 receives a threshold value from the outside, writes the threshold value in an internal memory, and generates the threshold value as a command value of several bits or a command value of several bits on the basis of the threshold value. The control circuit 2 outputs this command value to the D/A converter 3.

The comparator 5 is formed of an analog circuit and compares the above command value and the above detected voltage with each other. When the detected voltage is higher than the command value, the comparator 5 turns off the switching element Q1. That is, when the resonant voltage of a resonant circuit formed of the power transmission coil Lp and the resonant capacitor Cr is abnormally high, a switching operation is forcibly terminated to protect the high-frequency power supply device 101.

According to this embodiment, the flow of a current can be managed and safety can be ensured by inputting an appropriate threshold value corresponding to the application and use environment of a high-frequency power supply device into the control circuit 2 from the outside. Furthermore, a threshold value can be changed in a programmable manner. Safety and convenience can therefore be improved in accordance with the use environment and secular change of a high-frequency power supply device. Still furthermore, even if the use environment of the high-frequency power supply device 101 is changed or the high-frequency power supply device 101 undergoes a secular change, power requested from a load can be supplied while safety is ensured by performing feedback on threshold values and setting a threshold value by machine learning.

Second Embodiment

Figure 2:
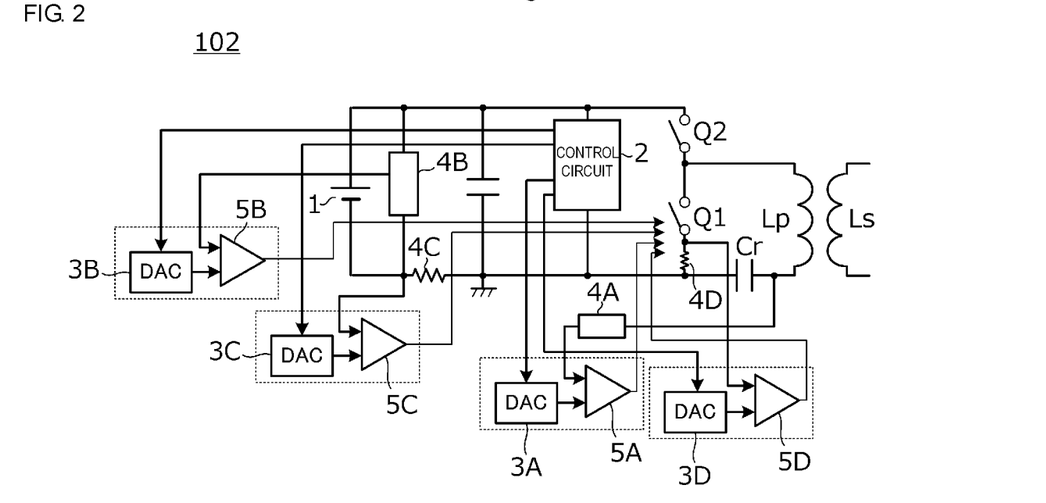
FIG. 2 is a circuit diagram of a high-frequency power supply device 102 according to a second embodiment.

In the second embodiment, a high-frequency power supply device 102 will be described which includes a plurality of detection circuits, a plurality of D/A converters, and a plurality of comparators. In the high-frequency power supply device 102, a stop signal is supplied to a plurality of points.

FIG. 2 is a circuit diagram of the high-frequency power supply device 102 according to the second embodiment. The high-frequency power supply device 102 includes a power transmission coil Lp that is magnetically coupled to a power receiving coil Ls that is a power receiving device and a high-frequency power circuit for converting a direct-current power input from a direct-current power supply 1 into high-frequency power and supplying the high-frequency power to the power transmission coil Lp. In this example, the high-frequency power supply device 102 includes switching elements Q1 and Q2 connected to the direct-current power supply 1, a resonant capacitor Cr, and a driver circuit (not illustrated) for driving the switching elements Q1 and Q2.

The high-frequency power supply device 102 includes various detection circuits 4A, 4B, 4C, and 4D, D/A converters 3A, 3B, 3C, and 3D, and comparators 5A, 5B, 5C, and 5D. The D/A converters 3A, 3B, 3C, and 3D pair up with the comparators 5A, 5B, 5C, and 5D, respectively.

The detection circuit 4A is the same as the detection circuit 4 illustrated in FIG. 1 and detects the resonant voltage of a resonant circuit formed of the power transmission coil Lp and the resonant capacitor Cr. The detection circuit 4B detects the voltage of the direct-current power supply 1. The detection circuit 4C detects a current input from the direct-current power supply 1. The detection circuit 4D detects a current flowing through the switching element Q1.

The control circuit 2 supplies a command value used to perform protection in accordance with the above resonant voltage to the D/A converter 3A. The control circuit 2 supplies a command value used to perform protection in accordance with the voltage of the direct-current power supply to the D/A converter 3B. The control circuit 2 supplies a command value used to perform protection in accordance with the above input current to the D/A converter 3C. The control circuit 2 supplies a command value used to perform protection in accordance with the current of the switching element Q1 to the D/A converter 3D.

Each of the comparators 5A, 5B, 5C, and 5D compares a command voltage output from corresponding one of the D/A converters 3A, 3B, 3C, and 3D and the above detected voltage with each other and turns off the switching element Q1 when the detected voltage is higher than the command voltage. That is, when any one of the resonant voltage, the voltage of the direct-current power supply, the input current, the current flowing through the switching element is in an abnormal condition, the switching operation is stopped to protect the high-frequency power supply device 102.

The D/A converters 3A, 3B, 3C, and 3D and the comparators 5A, 5B, 5C, and 5D are suitable to realize a response speed requested for the high-frequency power circuit protection operation. With this configuration, cost reduction can be realized while necessary responsivity is ensured.

Third Embodiment

In the third embodiment, a high-frequency power supply device configured to perform abnormality control using a plurality of stop signals will be described.

Figure 3:
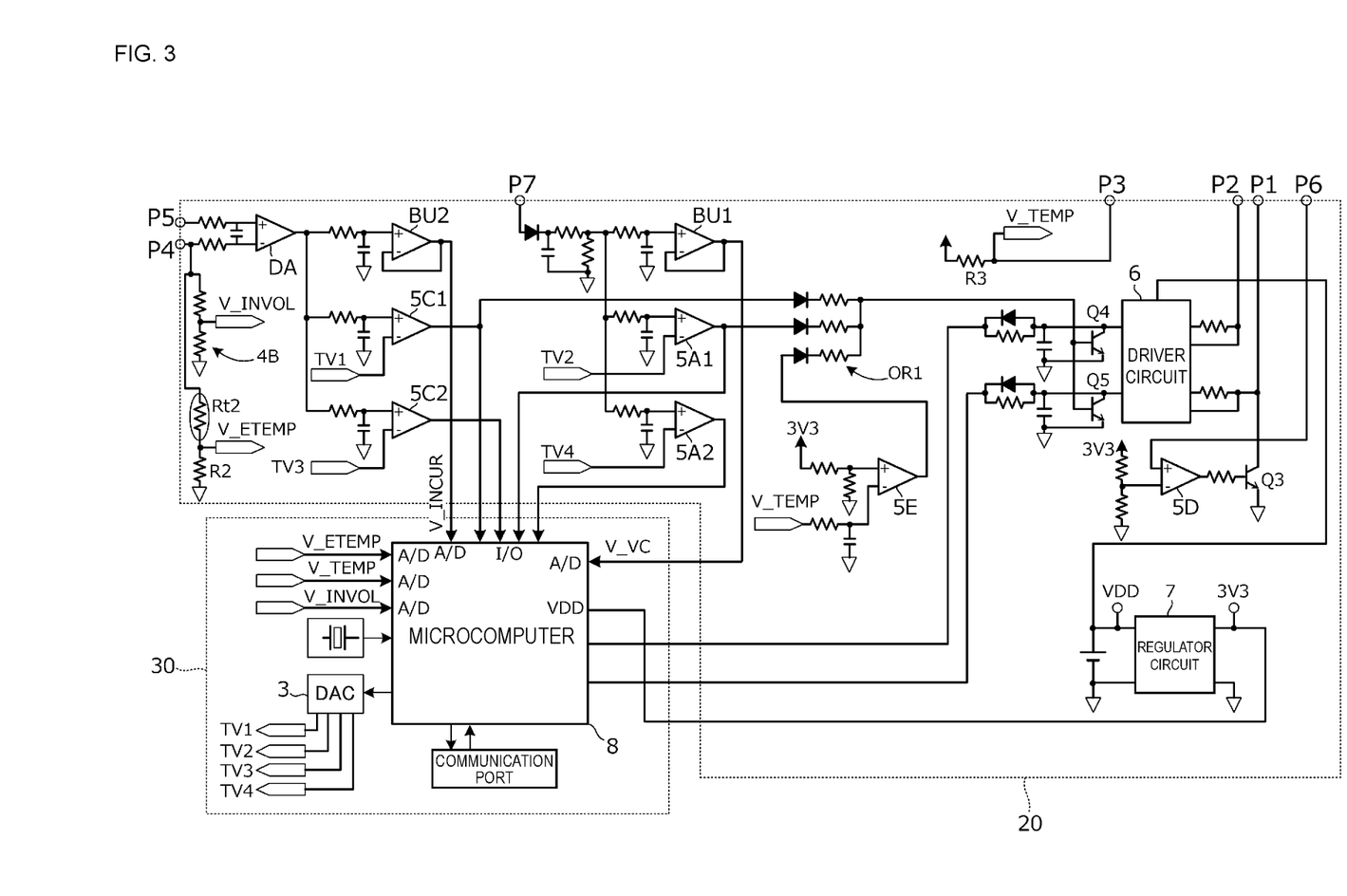
FIG. 3 is a circuit diagram of a power conversion circuit in a high-frequency power supply device according to a third embodiment.
Figure 4:
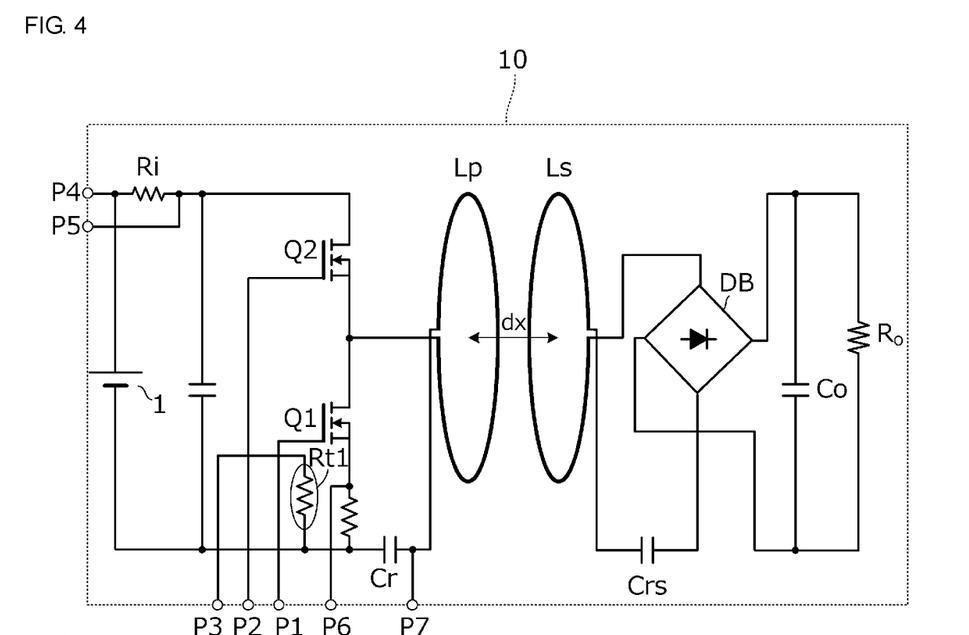
FIG. 4 is a circuit diagram of an analog control circuit and a digital control circuit in a high-frequency power supply device according to the third embodiment.

FIGS. 3 and 4 are circuit diagrams of a high-frequency power supply device according to the third embodiment. This high-frequency power supply device includes a power conversion circuit 10, an analog control circuit 20, and a digital control circuit 30. Terminals P1 to P7 of the analog control circuit 20 illustrated in FIG. 3 are connected to terminals P1 to P7 of the power conversion circuit 10, respectively.

In the power conversion circuit 10 illustrated in FIG. 4, a power transmission device includes a direct-current power supply 1, an input current detection resistor Ri, switching elements Q1 and Q2, a power transmission coil Lp, a resonant capacitor Cr, and a thermistor Rt1. A power receiving device includes a power receiving coil Ls, a diode bridge DB, a resonant capacitor Crs, a smoothing capacitor Co, and a load Ro. The power transmission coil Lp and the power receiving coil Ls are apart from each other by a distance dx.

The analog control circuit 20 illustrated in FIG. 3 includes buffers BU1 and BU2, a differential amplifier DA, comparators 5A1, 5A2, 5C1, 5C2, 5D, and 5E, a detection circuit 4B, switching elements Q3, Q4, and Q5, a driver circuit 6, and a regulator circuit 7. The digital control circuit 30 includes a microcomputer 8 and a D/A converter 3. The regulator circuit 7 steps down a direct-current power supply voltage VDD to a predetermined voltage and supplies the voltage to each portion as a power supply voltage for a comparator or a voltage used to generate a reference voltage. In FIG. 3, "3V3" represents a 3.3 V power supply line. The microcomputer 8 is an example of a "processor" according to the present disclosure.

The analog control circuit 20 and the microcomputer 8 correspond to a "control circuit configured to control a high-frequency power circuit" according to the present disclosure.

The differential amplifier DA amplifies the voltage across the current detection resistor Ri in the power conversion circuit 10. The buffer BU2 performs buffering upon the output voltage of the differential amplifier DA and inputs the voltage to a first analog input terminal of the microcomputer 8. The comparator 5C1 compares the output voltage of the differential amplifier DA and a target voltage TV1 with each other. The comparator 5C2 compares the output voltage of the differential amplifier DA and a target voltage TV2 with each other.

The output signal of the comparator 5C1 is input into a first I/O port of the microcomputer 8. The output signal is also input into a first input portion of a diode OR circuit OR1. The output signal of the comparators 5C2 is input into a second I/O port of the microcomputer 8.

The buffer Bi11 performs buffering upon the rectified voltage of the voltage at the terminal P7 (the resonant voltage of the power conversion circuit 10) and inputs the voltage to a second analog input terminal of the microcomputer 8. The comparator 5A1 compares the above rectified voltage and the target voltage TV2 with each other. The comparator 5A2 compares the above rectified voltage and a target voltage TV4 with each other.

The output signal of the comparator 5A1 is input into a third I/O port of the microcomputer 8. This output signal is also input into a second input portion of the diode OR circuit OR1. The output signal of the comparator 5A2 is input into a fourth I/O port of the microcomputer 8.

The detection circuit 4B divides the voltage at the terminal P4 (the voltage of the direct-current power supply 1) to generate an input power-supply voltage detection signal V_INVOL. The input power-supply voltage detection signal V_INVOL is input into a third analog input terminal of the microcomputer 8.

A dividing circuit formed of a resistor R3 in the analog control circuit 20 and the thermistor Rt1 in the power conversion circuit 10 generates a temperature detection signal V_TEMP of the switching elements Q1 and Q2. The comparator 5E compares the temperature detection signal V_TEMP and a reference voltage with each other. The output signal of the comparator 5E is input into a third input portion of the diode OR circuit OR1. The temperature detection signal V_TEMP is also input into a fourth analog input terminal of the microcomputer 8.

A dividing circuit formed of a resistor R2 and a thermistor Rt2 in the analog control circuit 20 generates an environmental temperature detection signal V_ETEMP. The microcomputer 8 compares the environmental temperature detection signal V_ETEMP and a reference value with each other. The environmental temperature detection signal V_ETEMP is input into a fifth analog input terminal of the microcomputer 8.

The output of the diode OR circuit OR1 is connected to the bases of the switching elements Q4 and Q5. The driver circuit 6 drives the switching elements Q1 and Q2 in the power conversion circuit 10 in accordance with a signal output from the microcomputer 8. The switching elements Q4 and Q5 are turned on, so that a signal to be input into the driver circuit 6 is shunted to the ground.

The comparator 5D compares a voltage at the terminal P6 (the detection voltage of a current flowing through the switching element Q1) and a reference voltage with each other and controls the switching element Q3 on the basis of a result of the comparison. The switching element Q3 is connected to the gate of the switching element Q1 in the power conversion circuit 10 via the terminal P1.

The microcomputer 8 demodulates the change (bit pattern) in an output signal V_INCUR of the buffer BU2 and reads several bits of data transmitted from the power receiving device. The microcomputer 8 demodulates (bit pattern) in an output signal V_VC of the buffer BU1 and reads several bits of data transmitted from the power receiving device.

The microcomputer 8 reads the value of V_ETEMP based on the environmental temperature of the microcomputer 8 and corrects a command value to be output to the D/A converter 3 in accordance with the environmental temperature. A portion of the microcomputer 8 which performs this operation corresponds to a "command value correction unit" according to the present disclosure. For example, a command value is corrected on the basis of temperature derating characteristics of the high-frequency power supply device to ensure that a load does not exceeds the maximum load specified by an environmental temperature.

The microcomputer 8 performs power adjustment (power control) by programmable feedback control. One of pieces of input information is information (external communication information) obtained by communication with an external device via a communication port in the digital control circuit 30. On the basis of the external communication information, output power is adjusted. The other piece of information is information (internal communication information) obtained by demodulating a communication signal that the power receiving device has transmitted with load modulation. On the basis of the internal communication information, output power is adjusted.

The microcomputer 8 determines the command value to be output to the D/A converter 3 on the basis of the external communication information. Alternatively, the microcomputer 8 determines the above command value on the basis of the external communication information and various detected voltages.

The microcomputer 8 continues the operation of the high-frequency power circuit and also generates a data set by collecting pieces of data concerning an environmental temperature, the operating time of the high-frequency power circuit, and a detected voltage. The microcomputer 8 analyzes the data set and extracts a useful rule or a useful judgement criterion from the data set. On the basis of the extracted rule or judgement criterion, the microcomputer 8 corrects the command value. That is, an algorithm for specifying a command value is corrected by machine learning.

A power conversion circuit according to this embodiment is subjected to the following protection control.

[Excessive Input Current Protection]

When the microcomputer 8 detects that a power conversion circuit has been brought into a low-level (first-stage) excessive input current state and an input current has exceeded a predetermined value on the basis of the output voltage of the buffer BU2, the microcomputer 8 stops a switching control signal to be output to the driver circuit 6 or changes a duty. As a result, the excessive input current state is overcome.

In a middle-level (second-stage) excessive input current state, the output voltage of the comparator 5C2 is at an "H" level. When the microcomputer 8 detects this state, the microcomputer 8 stops a switching control signal to be output to the driver circuit 6. As a result, the excessive input current state is overcome. When these first-stage and second-stage excessive input current states are overcome, the microcomputer 8 detects this fact and restarts the output of a switching control signal to the driver circuit 6. That is, the power conversion circuit is automatically restored from the protection state.

In a high-level (third-stage) excessive input current state, the output voltage of the comparator 5C1 is at an "H" level and the switching elements Q4 and Q5 are turned on via the diode OR circuit OR1. This rapidly stops the switching operation of the power conversion circuit 10. When the microcomputer 8 detects that the power conversion circuit is in the third-stage excessive input current state on the basis of the output signal of the comparator 5C1, the microcomputer 8 stops a switching control signal to be output to the driver circuit 6. The OR circuit is configured to stop the circuit operation of a high-frequency power circuit when at least one stop signal functions.

[Excessive Resonant Voltage Protection]

When an abnormal metallic object is placed at the power transmission coil Lp or the power receiving device is in an abnormal state, a resonant voltage changes.

When the microcomputer 8 detects that a power conversion circuit has been brought into a low-level (first-stage) excessive resonant voltage state on the basis of the output voltage of the buffer BU1, the microcomputer 8 stops a switching control signal to be output to the driver circuit 6 or changes a duty. As a result, the excessive resonant voltage state is overcome.

In a middle-level (second-stage) excessive resonant voltage state, the output voltage of the comparator 5A2 is at an "H" level. When the microcomputer 8 detects this state, the microcomputer 8 stops a switching control signal to be output to the driver circuit 6. As a result, the excessive resonant voltage state is overcome. When these first-stage and second-stage excessive resonant voltage states are overcome, the microcomputer 8 detects this fact and restarts the output of a switching control signal to the driver circuit 6. That is, the power conversion circuit is automatically restored from the protection state.

In a high-level (third-stage) excessive resonant voltage state, the output voltage of the comparator 5A1 is at an "H" level and the switching elements Q4 and Q5 are turned on via the diode OR circuit OR1. This rapidly stops the switching operation of the power conversion circuit 10. When the microcomputer 8 detects that the power conversion circuit is in the third-stage excessive resonant current state on the basis of the output signal of the comparator 5A1, the microcomputer 8 stops a switching control signal to be output to the driver circuit 6.

[Excessive Input Voltage Protection]

When the voltage of the direct-current power supply 1 is an excessive input voltage, the microcomputer 8 detects this fact on the basis of the input power-supply voltage detection signal V_INVOL and stops a switching control signal to be output to the driver circuit 6 (stops oscillation). As a result, an operation at an excessive input voltage is prevented.

[Overheat Protection]

When the temperature of the switching elements Q1 and Q2 exceeds a predetermined value, the output of the comparator 5E is at an "H" level and the switching elements Q4 and Q5 are turned on via the diode OR circuit OR1. As a result, the switching operation of the power conversion circuit 10 rapidly stops.

When the microcomputer 8 detects that the switching elements Q1 and Q2 are in an overheat state on the basis of the temperature detection signal V_TEMP, the microcomputer 8 stops a switching control signal to be output to the driver circuit 6 (stops oscillation). When the microcomputer 8 detects that the switching elements Q1 and Q2 have not been in the overheat state on the basis of the temperature detection signal V_TEMP, the microcomputer 8 restarts the output of a switching control signal to the driver circuit 6. That is, the power conversion circuit is automatically restored from the protection state.

[Switching Element Current Protection]

When a current flowing through the switching element Q1 exceeds a predetermined value, the output of the comparator 5D is at an "H" level and the switching element Q3 is turned on. As a result, the switching element Q1 is forcibly turned off.

The relationship of $Tg<Td<Tc$ is established where Tg represents a delay time from the input of a stop signal from the comparator 5D to the gate of the switching element Q1 to a time at which the operation of a power conversion circuit actually stops, Td represents a delay time from the input of a stop signal to the driver circuit 6 to a time at which the operation of the power conversion circuit actually stops, and Tc represents a delay time from the input of a stop signal to the microcomputer 8 to a time at which the operation of the power conversion circuit actually stops.

The reference voltage of the comparator 5D may be supplied from the microcomputer 8 via the D/A converter 3 as a target value. As a result, a threshold value for the protection of a switching element current can be set in a programmable manner. The reference voltage of the comparator 5E may be similarly supplied from the microcomputer 8 via the D/A converter 3 as a target value. As a result, a threshold value for overheat protection can be set in a programmable manner.

According to this embodiment, the following effects are obtained.

[Response to Environmental Temperature]

By correcting a command value in accordance with an environmental temperature as described above, the protection of a high-frequency power supply device can be optimized in accordance with a temperature in an operating environment.

[Firmware Control]

According to this embodiment, various threshold values for an analog control circuit or a power conversion circuit can be set in a programmable manner. The difference in characteristics caused by, for example, product variations can be suppressed by setting a threshold value. That is, firmware control can be realized. Specifically, the setting can be performed at the following times.

(1) At startup, the initial setting of each target value (a value that becomes a target voltage by D/A conversion) is performed by executing a program.

(2) During a normal operation, each target value is adjusted and set in real time by executing a program.

(3) At shutdown, each target value is adjusted and set by executing a program.

Thus, a target value can be changed in a programmable manner. As a result, safety and convenience can be improved in accordance with the use environment and secular change of a device. Even if the use environment of the device is changed or the device undergoes a secular change, power requested from a load can be supplied while safety is ensured by performing feedback on target values to change a target value, that is, setting a target value by machine learning.

[Setting of Command Value Based on External Information]

According to this embodiment, on the basis of externally given information or on the basis of the external communication information and various detection voltages, a command value to be output to the D/A converter 3 is determined. The reliability of an entire system including the high-frequency power supply device and an external device using the high-frequency power supply device can therefore be increased.

[Algorithm Machine Learning]

Since an algorithm for specifying a command value is corrected by machine learning while the operation of a high-frequency power circuit is continued, optimum protection control is performed in accordance with an operating environment.

Figure 5:
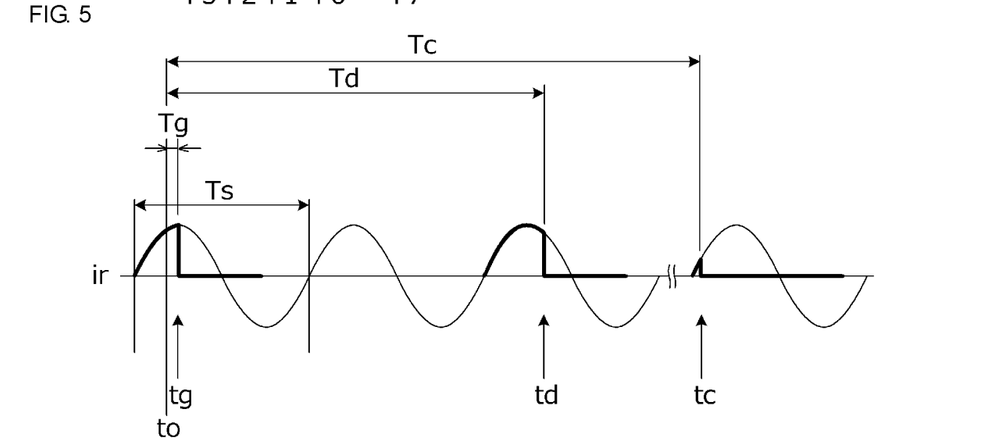
FIG. 5 is a waveform chart of a resonance current flowing through a power transmission coil in a high-frequency power supply device according to the third embodiment.

Next, delay times in a case where the above various protection controls are performed will be described with reference to FIG. 5. FIG. 5 is a waveform chart of a resonance current it flowing through the power transmission coil Lp. In FIG. 5, Ts represents a switching cycle. In a case where a current passing through the switching element Q1 is in an abnormal condition at a time to and the output of the comparator 5D becomes an "H" level, the switching element Q1 is turned off after a delay time Tg from the time to (almost instantaneously). In a case where the input of the driver circuit 6 becomes 0 V in response to the change in the output of one of the comparators 5A1, 5C1, and 5E to the "H" level, a power conversion circuit operation actually stops after a delay time Td (several cycles). In a case where the input of the driver circuit 6 becomes 0 V in response to the output of the microcomputer 8, a power conversion circuit operation actually stops after a delay time Tc (for example, a few milliseconds).

Since the stop times tg and td illustrated in FIG. 5 are independent of the control of the microcomputer 8, for example, zero voltage switching (ZVS) is not performed. In contrast, since the time tc is determined in response to the control of the microcomputer 8, ZVS can be performed.

Thus, according to this embodiment, the power conversion circuit operation can be stopped with optimum responsivity by selecting one of the control terminal of a switching element, the driver circuit, and the control circuit as a stop signal input destination in accordance with urgency of the stop of the power conversion circuit operation.

Lastly, the above descriptions of the embodiments are merely illustrative in all respects and are not limiting. It is obvious to those skilled in the art that variations and modifications can be made as appropriate. The scope of the present disclosure is not described in the embodiments, but recited in the appended claims. Furthermore, equivalents to the appended claims and all modifications of the present disclosure which fall within the scope of the present disclosure are intended to be encompassed in the scope of the present disclosure.

What is claimed is:

1. A high-frequency power supply device comprising:
   a power transmission coil that is magnetically coupled to a power receiving coil in a power receiving circuit;
   a high-frequency power circuit configured to convert direct-current power input from a direct-current power supply into high-frequency power and supply the high-frequency power to the power transmission coil;
   a detection circuit configured to detect a voltage based on a circuit operation of the high-frequency power circuit and output a detected voltage;
   a control circuit configured to control a circuit operation of the high-frequency power circuit, the control circuit including a processor into which information is input from an external device, and the controller being configured to determine a command value on the basis of the information, such that the controller determines the command value based on a value with which the high-frequency power circuit is protected;
   a D/A converter configured to perform D/A conversion upon receiving the command value output from the control circuit and output a command voltage; and
   a comparator comprising an analog electronic circuit and configured to compare the command voltage and the detected voltage with each other and output a stop signal, used to stop a circuit operation of the high-frequency power circuit, to the high-frequency power circuit.

2. The high-frequency power supply device according to claim 1, wherein
   the high-frequency power circuit includes a switching element connected to the direct-current power supply and a driver circuit configured to drive the switching element,
   the control circuit is configured to supply a switching control signal to the driver circuit,
   the control circuit is configured to supply a stop signal to one of a control terminal of the switching element, the driver circuit, and the control circuit, and a delay time from a time at which the stop signal starts to be input into a control terminal of the switching element to a time at which a power conversion circuit operation of the high-frequency power circuit stops, a delay time from a time at which the stop signal starts to be input into the driver circuit to a time at which a power conversion circuit operation of the high-frequency power circuit stops, and a delay time from a time at which the stop signal starts to be input into the control circuit to a time at which a power conversion circuit operation of the high-frequency power circuit stops, are set to decrease in this order.

3. A high-frequency power supply device comprising:
a power transmission coil that is magnetically coupled to a power receiving coil in a power receiving circuit;
a high-frequency power circuit configured to convert direct-current power input from a direct-current power supply into high-frequency power and supply the high-frequency power to the power transmission coil;
a detection circuit configured to detect a voltage based on a circuit operation of the high-frequency power circuit and output a detected voltage;
a control circuit configured to control a circuit operation of the high-frequency power circuit, and configured to determine a command value based on a value with which the high-frequency power circuit is protected;
a D/A converter configured to perform D/A conversion upon receiving the command value output from the control circuit and output a command voltage; and
a comparator comprising an analog electronic circuit and configured to compare the command voltage and the detected voltage with each other and output a stop signal, used to stop a circuit operation of the high-frequency power circuit, to the high-frequency power circuit,
wherein
the high-frequency power circuit includes a switching element connected to the direct-current power supply and a driver circuit configured to drive the switching element,
the control circuit is configured to supply a switching control signal to the driver circuit,
the control circuit is configured to supply a stop signal to one of a control terminal of the switching element, the driver circuit, and the control circuit, and
a delay time from a time at which the stop signal starts to be input into a control terminal of the switching element to a time at which a power conversion circuit operation of the high-frequency power circuit stops, a delay time from a time at which the stop signal starts to be input into the driver circuit to a time at which a power conversion circuit operation of the high-frequency power circuit stops, and a delay time from a time at which the stop signal starts to be input into the control circuit to a time at which a power conversion circuit operation of the high-frequency power circuit stops, are set to decrease in this order.

4. The high-frequency power supply device according to claim 3, wherein
the detection circuit is one of a plurality of detection circuits each configured to detect a voltage based on a circuit operation of a corresponding portion of the high-frequency power circuit and output the detected voltage,
the D/A converter is one of a plurality of D/A converters each configured to perform D/A conversion upon the command value output from the control circuit and output the command voltage,
the comparator is one of a plurality of comparators each configured to compare the command voltage and the detected voltage with each other and output the stop signal, and
the stop signal is supplied to two or more of the switching element, the driver circuit, and the control circuit.

5. The high-frequency power supply device according to claim 4, wherein
the voltage based on a circuit operation of the high-frequency power circuit includes two or more of a voltage input from the direct-current power supply, a voltage corresponding to a magnitude of a current input from the direct-current power supply, a voltage corresponding to a magnitude of a resonant voltage at the power transmission coil, a voltage corresponding to a temperature of the switching element, and a voltage corresponding to a magnitude of a current flowing through the switching element.

6. The high-frequency power supply device according to claim 5, wherein
a set of the detection circuit, the D/A converter, and the comparator is provided in plurality in accordance with a response speed requested for a protection circuit operation of the high-frequency power circuit.

7. The high-frequency power supply device according to claim 4, wherein
a set of the detection circuit, the D/A converter, and the comparator is provided in plurality in accordance with a response speed requested for a protection circuit operation of the high-frequency power circuit.

8. The high-frequency power supply device according to claim 4, wherein
the stop signals output from the plurality of respective comparators are supplied such that an OR circuit is formed in one of the switching element, the driver circuit, and the control circuit.

9. The high-frequency power supply device according to claim 4, wherein
the control circuit includes a command value correction unit configured to correct the command value in accordance with a temperature in an operating environment of the high-frequency power circuit.

10. The high-frequency power supply device according to claim 4, wherein
the control circuit includes a correction unit configured to perform analysis on the basis of a set of data on a temperature in an operating environment of the high-frequency power circuit, an operating time of the high-frequency power circuit, and the detected voltage, extract a rule or a judgement criterion from the set of data, and correct the command value on the basis of the rule or the judgement criterion by machine learning.

11. The high-frequency power supply device according to claim 3, wherein
the detection circuit is one of a plurality of detection circuits each configured to detect a voltage based on a circuit operation of a corresponding portion of the high-frequency power circuit and output the detected voltage,
the D/A converter is one of a plurality of D/A converters each configured to perform D/A conversion upon the command value output from the control circuit and output the command voltage, the comparator is one of a plurality of comparators each configured to compare the command voltage and the detected voltage with each other and output the stop signal, and the stop signals output from the plurality of respective comparators are supplied such that an OR circuit is formed in one of the switching element, the driver circuit, and the control circuit.

12. The high-frequency power supply device according to claim 11, wherein the voltage based on a circuit operation of the high-frequency power circuit includes two or more of a voltage input from the direct-current power supply, a voltage corresponding to a magnitude of a current input from the direct-current power supply, a voltage corresponding to a magnitude of a resonant voltage at the power transmission coil, a voltage corresponding to a temperature of the switching element, and a voltage corresponding to a magnitude of a current flowing through the switching element.

13. The high-frequency power supply device according to claim 11, wherein a set of the detection circuit, the D/A converter, and the comparator is provided in plurality in accordance with a response speed requested for a protection circuit operation of the high-frequency power circuit.

14. The high-frequency power supply device according to claim 3, wherein the control circuit includes a command value correction unit configured to correct the command value in accordance with a temperature in an operating environment of the high-frequency power circuit.

15. The high-frequency power supply device according to claim 3, wherein the control circuit includes a correction unit configured to perform analysis on the basis of a set of data on a temperature in an operating environment of the high-frequency power circuit, an operating time of the high-frequency power circuit, and the detected voltage, extract a rule or a judgement criterion from the set of data, and correct the command value on the basis of the rule or the judgement criterion by machine learning.

16. The high-frequency power supply device according to claim 1, wherein the control circuit includes a command value correction unit configured to correct the command value in accordance with a temperature in an operating environment of the high-frequency power circuit.

17. The high-frequency power supply device according to claim 1, wherein the control circuit includes a correction unit configured to perform analysis on the basis of a set of data on a temperature in an operating environment of the high-frequency power circuit, an operating time of the high-frequency power circuit, and the detected voltage, extract a rule or a judgement criterion from the set of data, and correct the command value on the basis of the rule or the judgement criterion by machine learning.

18. A high-frequency power supply device comprising:

a power transmission coil that is magnetically coupled to a power receiving coil in a power receiving circuit;

a high-frequency power circuit configured to convert direct-current power input from a direct-current power supply into high-frequency power and supply the high-frequency power to the power transmission coil;

a detection circuit configured to detect a voltage based on a circuit operation of the high-frequency power circuit and output a detected voltage;

a control circuit configured to control a circuit operation of the high-frequency power circuit, and configured to determine a command value based on a value with which the high-frequency power circuit is protected;

a plurality of D/A converters that output a command voltage by respectively D/A conversion of different command values that are output from the control circuit and that differ in accordance with the response speed of each of a plurality of output destinations that output a stop signal to stop the circuit operation of the high-frequency power circuit; and a plurality of comparators, each consisting of an analog electronic circuit, are connected to the output destination according to the command voltage input from the plurality of D/A converters, and configured to compare the command voltage and the detected voltage with each other and output a stop signal, used to stop a circuit operation of the high-frequency power circuit, to the high-frequency power circuit.

* * * * *